Figure 1:
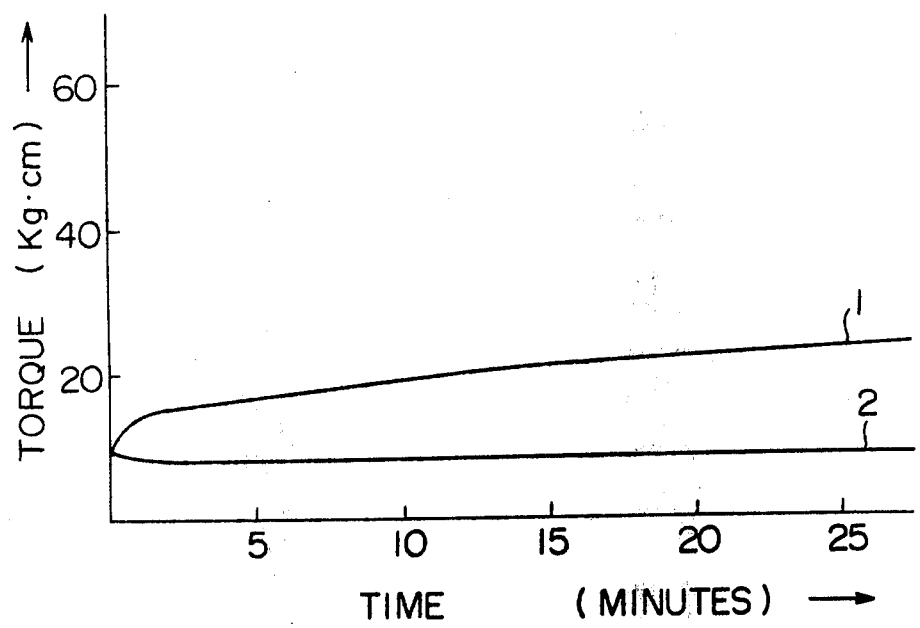

United States Patent [19]

Onizawa

[11] 4,124,575

[45] Nov. 7, 1978

[54] CURABLE COMPOSITION CONTAINING FLUORINE RUBBERS AND AMINO ACIDS

[75] Inventor: Masao Onizawa, Ohmiya, Japan

[73] Assignee: Sanyo Trading Co., Ltd., Tokyo, Japan

[21] Appl. No.: 789,275

[22] Filed: Apr. 20, 1977

[30] Foreign Application Priority Data

Apr. 23, 1976 [JP] Japan .................................. 51-45439

[51] Int. Cl.² ........................ C08F 8/32; C08G 73/02; C08F 18/00; C08G 19/46
[52] U.S. Cl. .......................................... 526/18; 526/49
[58] Field of Search .............. 260/78 UA; 526/18, 49, 526/78 A

[56] References Cited

U.S. PATENT DOCUMENTS

| | | | |
|---|---|---|---|
| 2,811,501 | 10/1957 | Stedry | 526/18 |
| 2,820,776 | 1/1958 | Robb et al. | 526/18 |
| 2,979,490 | 4/1961 | West | 526/18 |
| 3,041,316 | 6/1962 | Griffin | 526/18 |
| 3,142,660 | 7/1964 | Conger | 526/18 |
| 4,018,749 | 4/1977 | Onizawa | 526/18 |
| 4,018,750 | 4/1977 | Onizawa | 260/78 A |

*Primary Examiner*—Herbert J. Lilling
*Attorney, Agent, or Firm*—Wenderoth, Lind & Ponack

[57] ABSTRACT

Fluorine rubbers, such as vinylidene fluoride-type rubbers, are cured with a new vulcanizing agent which is at least one amino acid selected from arginine, lysine, ornithine, hydroxylysine, glutamine, cystine, asparagine and citrulline.

3 Claims, 1 Drawing Figure

CURABLE COMPOSITION CONTAINING FLUORINE RUBBERS AND AMINO ACIDS

This invention relates to a novel curable composition consisting essentially of a fluorine rubber and an amino acid.

The fluorine rubber is well known, and finds a wide range of applications because of its superior thermal stability and outstanding resistances to chemicals and oils.

Organic peroxides such as dicumyl peroxide, polyamines such as triethylene tetramine, and polyisocyanates are among known vulcanizing agents for fluorine rubbers. The present inventor has now found that specific amino acids are new and useful vulcanizing agents for fluorine rubbers.

The present invention thus provides a curable composition consisting essentially of a fluorine rubber and at least one amino acid selected from the group consisting of arginine, lysine, ornithine, hydroxylysine, glutamine, cystine, asparagine and citrulline.

The invention also provides a rubber article obtained by vulcanizing the curable composition.

The accompanying drawing shows the cure curves of compositions illustrated in Example to be given hereinbelow.

Various types of fluorine rubbers are known, and for example, vinylidene fluoride-type fluorine rubbers, fluorinated silicone-type fluorine rubbers, fluorinated nitroso-type fluorine rubbers, fluorinated acrylate-type fluorine rubbers, fluorinated polyester-type fluorine rubbers, fluorinated vinyl ether-type fluorine rubbers, fluorinated triazine-type and fluorinated phosphonitrile-type fluorine rubbers are commercially available.

Suitable fluorine rubbers for use in the composition of this invention are the vinylidene fluoride-type, fluorinated nitroso-type and fluorinated acrylate-type fluorine rubbers. Examples of the vinylidene fluoride-type fluorine rubbers are a vinylidene fluoride/hexafluoropropylene copolymer, a vinylidene fluoride/hexafluoropropylene/tetrafluoroethylene copolymer, a vinylidene fluoride/1,2,3,3,3-pentafluoropropylene copolymer, and a vinylidene fluoride/chlorotrifluoroethylene copolymer. The fluorinated nitroso-type fluorine rubbers include, for example, a trifluoronitrosomethane/tetrafluoroethylene copolymer, and a terpolymer of trifluoronitrosomethane, tetrafluoroethylene, and nitrosoperfluoropropionic acid or nitrosoperfluorobutyric acid as a third component. On the other hand, a polymer of 1,1-dihydroperfluorobutyl acrylate is an example of the fluorinated acrylate-type fluorine rubber. The vinylidene fluoride-type fluorine rubbers are especially preferred for use in the present invention.

The composition of this invention is characterized by containing a new vulcanizing agent which is at least one amino acid selected from the group consisting of arginine, lysine, ornithine, hydroxylysine, glutamine, cystine, asparagine and citrulline.

The amount of the amino acid contained in the composition is 0.1 to 30 parts by weight, preferably 1 to 10 parts by weight, per 100 parts by weight of the fluorine rubber.

The composition can be cured by employing usual temperature (e.g., 150° to 200° C.) and pressure conditions for fluorine rubbers.

The curable composition of the invention is suitable for various applications, for example as material for O-rings, oil seals, conveyor belts for iron and steel, printing rolls, fuel tanks for airplanes, rubber vibration-insulators and hoses.

The curable composition, as needed, may contain conventional compounding ingredients such as reinforcing agents, acid acceptors, processing aids or plasticizers.

The following Example illustrates the present invention. The quantities of ingredients given in the compounding recipes in Table 1 are in parts by weight. The properties of the cured composition in Run No. 1 were determined by the following methods.

Tensile strength and elongation

Measured in accordance with JIS K-6301 using a Schopper-type tensile tester at a stretching rate of 500 mm/min.

Hardness

Measured by a JIS A-type hardness tester.

EXAMPLE

A composition of the recipe for Run No. 1 in Table 1 was prepared in a customary manner using a mixing roll. The composition was pre-cured for 30 minutes by an electrically heated hot press kept at 180° C. The composition was taken out, and then post-cured for 2.5 hours in an oven kept at 180° C.

The properties of the cured fluorine rubber are shown in Table 1. The data show that the fluorine rubber can be cured with a mixture of lysine and arginine.

For comparison, a composition of the recipe for Run No. 2 in Table 1 which did not contain an amino acid was prepared, and heat-treated in the same way as in Run No. 1. No vulcanization of the composition occurred, and therefore, its properties were not measured.

Table 1

| Compounding recipe | Run No. 1 (invention) | Run No. 2 (comparison) |
|---|---|---|
| Fluorine rubber[1] | 100 | 100 |
| FT carbon black[2] | 20 | 20 |
| Magnesium oxide[3] | 15 | 15 |
| TE-58A[4] | 1 | 1 |
| 50% Aqueous solution of lysine | 2.5 | — |
| Arginine | 2.5 | — |
| Vulcanizate properties | | |
| Tensile strength (kg/cm$^2$) | 120 | — |
| Elongation (%) | 390 | — |
| Hardness | 76 | — |

Note
[1] DAI-EL G-501 (a registered trademark for a hexafluoropropene/vinylidene fluoride tetrafluoroethylene copolymer made by Daikin Kogyo Co., Ltd., Japan).
[2] Fine thermal furnace carbon black added as a reinforcing agent.
[3] Added as an acid acceptor.
[4] An alkali metal salt of a higher fatty acid produced by Technical Processing Company, U.S.A., which was added as a roll-processability improver.

In order to confirm that the composition of Run No. 1 would be cured by heating, its cure curve was measured by a JSR-type curelastometer held at a temperature of 180° C. The cure curve obtained is shown in the FIGURE as curve 1. The cure curve of the composition of Run No. 2 which did not contain an amino acid was also measured by the same method, and is shown as curve 2 in the FIGURE. A comparison of curve 1 with curve 2 in the FIGURE shows that the composition of Run No. 1 is curable, but the composition of Run No. 2 does not cure.

What is claimed is:

1. A curable composition consisting essentially of (a) a fluorine rubber selected from the group consisting of a vinylidene fluoride/hexafluoropropylene copolymer, a vinylidene fluoride/hexafluoropropylene/tetrafluoroethylene copolymer, a vinylidene fluoride/1,2,3,3,3-pentafluoropropylene copolymer, a vinylidene fluoride/chlorotrifluoroethylene copolymer, a trifluoronitrosomethane/tetrafluoroethylene copolymer, a terpolymer of trifluoronitrosomethane, tetrafluoroethylene, and nitrosoperfluoropropionic acid or nitrosoperfluorobutyric acid as a third component, and a polymer of 1,1-dihydroperfluorobutyl acrylate and (b) at least one amino acid selected from the group of arginine, lysine, ornithine, hydroxylysine, glutamine, cystine, asparagine and citrulline, the content of amino acid being 0.1 to 30 parts by weight per 100 parts by weight of the fluorine rubber.

2. A composition according to claim 1 wherein the amino acid content is 1 to 10 parts by weight per 100 parts by weight of the fluorine rubber.

3. A rubber article obtained by vulcanizing a composition of claim 1.